United States Patent [19]

Patil et al.

[11] Patent Number: 4,571,116
[45] Date of Patent: Feb. 18, 1986

[54] METHOD FOR SUPPRESSING DUST ON DIRT ROADS AND THE LIKE

[75] Inventors: Bhalchandra B. Patil, Reynoldsburg; J. Matthew White, Newark, both of Ohio

[73] Assignee: Owens-Corning Fiberglas Corporation, Toledo, Ohio

[21] Appl. No.: 520,788

[22] Filed: Aug. 5, 1983

[51] Int. Cl.$^4$ .................. E01C 7/36; E01C 21/00; E02D 3/12
[52] U.S. Cl. ........................... 404/76; 404/75; 106/277; 252/88
[58] Field of Search ............... 404/75, 76; 252/88, 252/311.5; 106/277, 278; 427/136, 138

[56]  References Cited

U.S. PATENT DOCUMENTS

| 1,995,598 | 3/1935 | Archibald | 404/76 |
| 2,797,169 | 6/1957 | Mertens | 106/273 |
| 2,993,002 | 7/1961 | Wright et al. | 252/311.5 |
| 3,036,054 | 5/1962 | Wheeler | 525/62 |
| 3,162,101 | 12/1964 | Rostler | 427/138 |
| 3,399,608 | 9/1968 | Benson | 404/76 |
| 3,445,258 | 5/1969 | Ferm et al. | 106/277 |
| 3,753,752 | 8/1973 | Pitchford | 252/311.5 X |
| 3,825,513 | 7/1974 | Rostler | 404/76 X |
| 3,879,365 | 4/1975 | Greminger, Jr. et al. | 526/200 |
| 4,072,020 | 2/1978 | Bishop | 404/76 X |
| 4,137,204 | 1/1979 | McDonald | 106/277 X |
| 4,211,575 | 7/1980 | Burris | 106/277 X |
| 4,405,375 | 9/1983 | Gibson et al. | 106/277 X |
| 4,417,992 | 11/1983 | Bhattacharyya et al. | 404/76 X |

OTHER PUBLICATIONS

"Description of Types of Petroleum Extender Oils", ANSI/ASTM D2226-70 (reapproved 1975), pp. 548, 549.
Coherex Dust Control Manuel, Witco, pp. 1-23 (20803).

Primary Examiner—Stephen J. Novosad
Assistant Examiner—Beverly E. Hjorth
Attorney, Agent, or Firm—Ronald C. Hudgens; Ted C. Gillespie; Debra L. Pawl

[57]  ABSTRACT

An aqueous emulsion of a blend of asphalt having viscosity at 165° F. of about 100 to about 1000 centipoises with a petroleum extender oil preferably having a viscosity at 40° C. of not more than about 1000 centistokes, preferably stabilized with a protective colloid in conjunction with conventional surfactants, provides a particularly effective and long-lasting treatment of substrates, such as dirt or gravel roads and the like, for suppressing the evolution of fugitive dust therefrom by applying the emulsion, usually in dilute form, to the exposed surface of the substrate, as by spraying.

8 Claims, No Drawings

METHOD FOR SUPPRESSING DUST ON DIRT ROADS AND THE LIKE

TECHNICAL FIELD

This invention relates to dust suppression on dirt or gravel roads and the like, and to aqueous emulsions of petroleum products useful therefor.

BACKGROUND OF THE INVENTION

Many compositions have been applied to the exposed surfaces of dirt or gravel roads, piles of dirt, excavated overburden, mine tailings, etc., and similar substrates in order to suppress the evolution of fugitive dust therefrom in response to disturbance by wind, traffic, etc. The simplest and probably the earliest material used for this purpose is water, but while it is usually inexpensive, its effectiveness is limited and the required frequency of application is burdensome. A variety of petroleum products, such as discarded crankcase oil and high viscosity asphalts, have also been used, but have variously suffered from irregularity of supply, poor reproducibility of effectiveness, uncontrolled contamination, inadequate durability, etc. In particular, high viscosity asphalts, ordinarily applied as aqueous emulsions, while initially effective, have been found to form a hard crust on the surface of the substrate which deteriorates upon exposure to weather, traffic, etc., with a concomitant reduction in effectiveness in suppressing dust evolution.

The use of the compositions of the present invention for dust suppression overcomes many of the shortcomings of prior compositions and provides an effective and durable treatment for substrates to suppress the evolution of fugitive dust.

SUMMARY OF THE INVENTION

The present invention is an improvement in a method for suppressing the evolution of fugitive dust from a substrate which comprises applying to the exposed surface of said substrate an effective amount of a petroleum product emulsified in aqueous medium, which comprises employing as said petroleum product a blend of an asphalt having a viscosity at 165° F. of about 100 to about 1000 centipoises and an extender oil.

DETAILED DESCRIPTION

The asphalt component of the aqueous compositions used in the invention can be any asphalt of low viscosity, preferably having viscosity at 165° F. of about 100 to about 1000 centipoises. Also the asphalt employed should preferably be very low in asphaltene content. Ordinarily the preferred asphalts will also have specific gravity less than 1.

The extender oil component is a petroleum product primarily used as an extender and modifier in rubber compositions. Extender oils are characterized in ASTM Standard D2226 entitled "Standard Recommended Practice for Description of Types of Petroleum Extender Oils", incorporated herein by reference. It is preferred that extender oils for use in the present invention have viscosity at 40° C. not greater than about 1000 centistokes. It is also preferred that they have very low asphaltene content.

The asphalt and the extender oil are ordinarily blended together prior to emulsification. The relative proportions of these two components can vary widely, preferably being from about 20:80 to about 80:20, and more preferably from about 40:60 to about 60:40, asphalt:extender oil, by weight.

A wide variety of conventional emulsifiers can be used, but a combination of nonionic with either anionic or cationic surfactants is preferred. It is also found that the stability of the emulsions is much improved by the incorporation of a protective colloid, preferably from about 0.02 to about 0.5 percent by weight based on the total weight of the petroleum products emulsified. A wide variety of conventional protective colloids can be used.

It is ordinarily convenient and preferred to initially prepare a concentrated emulsion, e.g., about 50 to about 65 weight percent non-volatiles, in order to minimize storage and transportation costs, and then dilute this concentrated emulsion in the field to some lower concentration which may be more convenient and preferred for application to the substrate. Ordinarily the highest solids level that is reproducibly stable will be the most economical for such initial concentrated emulsions.

EXAMPLES 1-3

Preferred aqueous compositions of the invention have been made according to the following formulations:

| Component | Parts by Weight | | |
|---|---|---|---|
| | 1 | 2 | 3 |
| Asphalt-Trumbull #632-210 cps @ 165F | 30 | | |
| Asphalt-Trumbull #432-210 cps @ 165F | | 30 | |
| Asphalt-Trumbull #132-500 cps @ 165F | | | 30 |
| Shellflex 1790 Extender Oil | 30 | 30 | |
| Shellflex 790 Extender Oil | | | 30 |
| Igepal CO-530 (non-ionic surfactant) | 1.2 | 2.4 | 0.9 |
| Redicote E-4868 (cationic surfactant) | 0.3 | 0.3 | 0.3 |
| Armak I-115 (colloid) | 0.04 | 0.04 | 0.04 |
| HCl | 0.05 | 0.05 | 0.06 |
| Water | 40 | 40 | 40 |

The asphalts all had essentially no asphaltene content and are products of the Trumbull Asphalt Division of Owens-Corning Fiberglas Corporation. The Shellflex (TM/Shell) 1790 and 790 extender oils are products of Shell Chemical Co. having viscosities at 40° C. of 525 and 530 centistokes, respectively, and both having essentially no asphaltene content. Igepal CO-530 (TM/GAF) is an ethoxylated p-nonylphenol nonionic surfactant having an HLB index of about 10 and is a product of GAF Corp. Redicote E-4868 (TM/Armak) is a tolyl diamine cationic emulsifier product of the Highway Chemicals Dept. of Armak Co. Armak I-115 is an ethoxylated guar gum protective colloid, also a product of Armak.

The asphalt was preheated to at least about 170° F. to ensure its fluidity and the extender oil was preheated to at least about 120° F. and the two components were then mixed together to form a homogeneous blend. The non-ionic surfactant was also mixed into this blend.

The other surfactants and the protective colloid were separately dissolved in portions of the water and then mixed together to form a soap solution. (The acid was first added to the portion of water in which the cationic surfactant was dissolved.) After mixing, the pH of the soap solution was adjusted, if necessary, to the range of about 2.3 to 2.9.

The warm soap solution, at a temperature of about 100° to about 120° F., was circulated through a conventional mills, such as a Lightning Mixer, to warm the mill and then the mill was brought up to speed and the hot fluent blend of asphalt and extender oil, at a temperature of about 150° to about 180° F., was slowly added to the soap solution and emulsified in the mill. The pH of the emulsion was adjusted, if necessary to about 2 to 4. The concentrated emulsion (about 60% non-volatiles) was discharged at a temperature of about 130°–160° F. These emulsions were stable for extended periods and produced effective and long-lasting dust suppression when diluted with water and applied by spraying to dirt and gravel roads and other substrates similarly prone to evolution of fugitive dust.

For field application to substrates it is usually convenient to dilute the concentrated emulsion. A typical dilution ratio is about 3:1 water:concentrate, but any convenient dilution may be used. For substrates subject to no more than light traffic, application rates of about 0.5 to about 1 gallon of diluted emulsion containing about 15 percent by weight non-volatiles, or corresponding amounts of non-volatiles at other dilutions, per square yard of substrate have usually been found preferable to give a good balance of effectiveness, durability and cost; such treatments have been found to typically remain effective for about 8–10 weeks. More or less can be advantageously applied in suitable circumstances; for example, on mine haul roads or other dirt or gravel roads subject to heavy traffic, heavier applications, e.g., about double those indicated for light traffic situations, will usually be advantageous. Application is ordinarily by means of conventional spraying equipment.

The asphalt-oil blend of this invention typically penetrates the surface of the substrate and does not ordinarily form the hard surface crust typically found when high viscosity asphalts are used, which is thought to contribute to the longer period of effectiveness of the treatment of the present invention as compared to treatments using high viscosity asphalts.

Numerous variations and modifications of the invention as described herein in detail will be apparent to those skilled in the art and are intended to be comprehended by the present description and claims.

We claim:

1. In a method for suppressing the evolution of fugitive dust from a substrate which comprises applying to the exposed surface of said substrate an effective amount of a petroleum product emulsified in an aqueous medium, the improvement comprising employing as said petroleum product a composition consisting essentially of an emulsified blend of an asphalt having a viscosity at 165° F. of about 100 to about 1000 centipoises, a petroleum extender oil and a protective colloid.

2. An improvement according to claim 1 wherein said extender oil has a viscosity at 40° C. of not more than about 1000 centistokes.

3. An improvement according to claim 2 wherein said blend comprises said asphalt and said extender oil in ratio by weight from about 20:80 to about 80:20, respectively.

4. An improvement according to claim 1 wherein said blend comprises said asphalt and said extender oil in ratio by weight from about 40:60 to about 60:40, respectively.

5. An improvement according to claim 4 wherein the amount of said protective colloid is from about 0.02 to about 0.5 percent by weight relative to the amount of the petroleum product.

6. An improvement according to claim 1 wherein said substrate comprises earth.

7. An improvement according to claim 1 wherein said substrate comprises mine tailings.

8. An improvement according to claim 1 wherein said substrate comprises a dirt or gravel road.

* * * * *